(12) United States Patent
Fujisaki et al.

(10) Patent No.: US 11,366,333 B2
(45) Date of Patent: Jun. 21, 2022

(54) CAMERA DEVICE HAVING HAND-SHAKE CORRECTION FUNCTION

(71) Applicant: AAC Optics Solutions Pte. Ltd., Singapore (SG)

(72) Inventors: Yoshifumi Fujisaki, Osaka (JP); Shikama Kazuo, Osaka (JP)

(73) Assignee: AAC Optics Solutions Pte. Ltd., Singapore (SG)

(*) Notice: Subject to any disclaimer, the term of this patent is extended or adjusted under 35 U.S.C. 154(b) by 181 days.

(21) Appl. No.: 16/719,989

(22) Filed: Dec. 19, 2019

(65) Prior Publication Data
US 2020/0333622 A1    Oct. 22, 2020

(30) Foreign Application Priority Data
Apr. 16, 2019 (JP) .............................. JP2019-077713

(51) Int. Cl.
*G02B 27/64* (2006.01)
*G02B 7/182* (2021.01)
*G03B 5/00* (2021.01)

(52) U.S. Cl.
CPC ........... *G02B 27/646* (2013.01); *G02B 7/182* (2013.01); *G03B 5/00* (2013.01); *G03B 2205/0023* (2013.01); *G03B 2205/0069* (2013.01)

(58) Field of Classification Search
CPC ......................... G02B 27/646; G02B 26/0816; G02B 26/085; G02B 13/0065; G02B 13/001; G02B 27/648; G02B 7/00; G02B 7/182; G03B 17/17; G03B 2205/0023; G03B 5/00; G03B 2205/0069; G03B 2205/0015; H04N 5/23248
See application file for complete search history.

(56) References Cited

U.S. PATENT DOCUMENTS

2009/0122406 A1* 5/2009 Rouvinen ............ G02B 27/646
                                                          359/555
2018/0239161 A1* 8/2018 Seol .................... G02B 27/646
2019/0230262 A1* 7/2019 Wang ..................... G02B 3/12

* cited by examiner

*Primary Examiner* — Cara E Rakowski
(74) *Attorney, Agent, or Firm* — W&G Law Group

(57) ABSTRACT

The present disclosure provides an anti-shake mechanism of a curved camera device. The camera device is an optical system including a reflecting member having a reflecting surface that bends an optical axis and is configured to perform a hand-shake correction by rotating the reflecting member. The reflecting member is arranged to be closer to an object side than a camera lens group. When a first rotation axis is set as an axis perpendicular to a plane defined by an optical axis of the camera lens group and an object-side optical axis reflected by the reflecting member and a second rotation axis is set as an axis parallel with the reflected object-side optical axis, the reflecting member is caused to rotate about the first rotation axis and the second rotation axis.

8 Claims, 11 Drawing Sheets

CAMERA DEVICE HAVING HAND-SHAKE CORRECTION FUNCTION

TECHNICAL FIELD

The present disclosure relates to a camera device having a hand-shake correction function.

BACKGROUND

With the rapid development of photographic technology, lens driving devices have been widely used in numerous photographic devices. Applications of the lens driving devices to various portable electronic devices, such as mobile phones, tablets, etc., are particularly acceptable to consumers.

A drive mechanism applicable for a lens driving device of a general portable electronic device is generally formed by a coil and a permanent magnet. The coil is fixed to an outer circumference of a camera lens frame. When a current is applied to the coil, by an action of an electromagnetic force, the coil causes the camera lens frame to move along a direction of an optical axis of a lens, thereby achieving focusing. In addition, when a user holds the electronic apparatus with hands to take an image, shake of the lens driving device caused by hand-shake can be corrected by driving in a direction perpendicular to the optical axis. However, for example, for a zoom optical system, which has a relatively long total optical length, of a small optical device provided on a portable electronic device, it is difficult for it to be directly provided on the portable electronic device, and it is necessary to use a structure such as a curvature.

For such an optical system using a curved structure, a camera lens, which is disposed before and after a prism or a mirror for bending a light, is used for the shake correction, whereas in the portable electronic devices which are developed towards miniaturization, due to the use of these shake correction structures of the camera lens disposed before and after, a total length of the curved optical system may become longer, or it may become a structure in which a part of a shape protrudes.

Therefore, it is necessary to provide a new lens driving device that can solve the above problems.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further illustrated with reference to the accompanying drawings and the embodiments.

FIGS. 1 to 7 are views showing a curved camera device 100 of the present disclosure.

FIGS. 1 to 22 show a camera device and constituent elements thereof according to an embodiment of the present disclosure. A camera optical system of the curved camera device 100 is a curved optical system, which includes, from an object side, a prism 21 serving as a reflecting member, a camera lens group 31 and a camera element 51, and reflects a light beam by the prism 21.

The light beam, which is incident on an incident surface 21-a of the prism 21 along a first optical axis O1 from an object to be captured, is reflected by a reflecting surface 21-b of the prism 21 towards a direction along a second optical axis O2 and emitted from an emission surface 21-c. Then, the light beam passes through the camera lens group 31 located on the second optical axis O2 and is imaged on a camera surface of the camera element 51.

Figure 4:
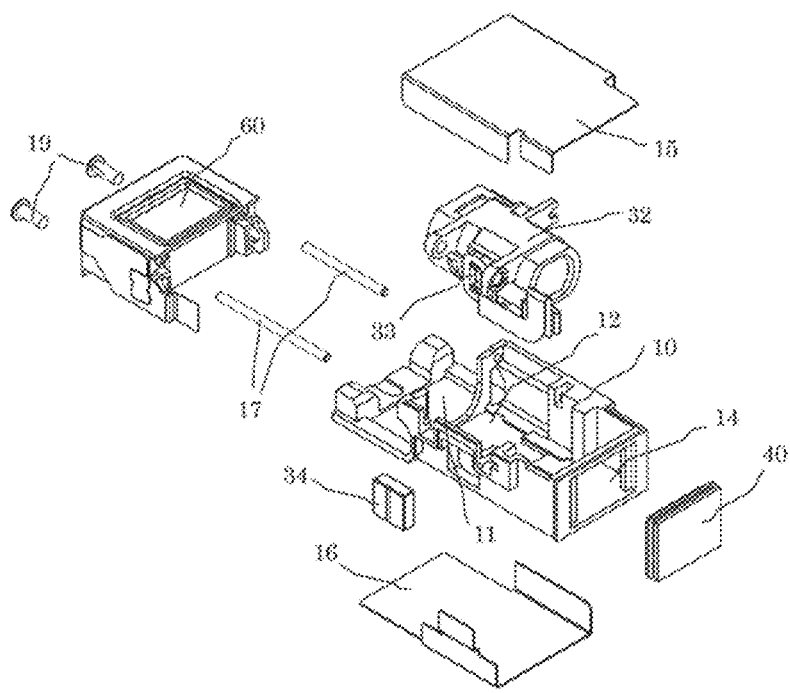
FIG. 4 is an exploded view of a curved camera device according to an embodiment of the present disclosure viewed from below.
Figure 5:
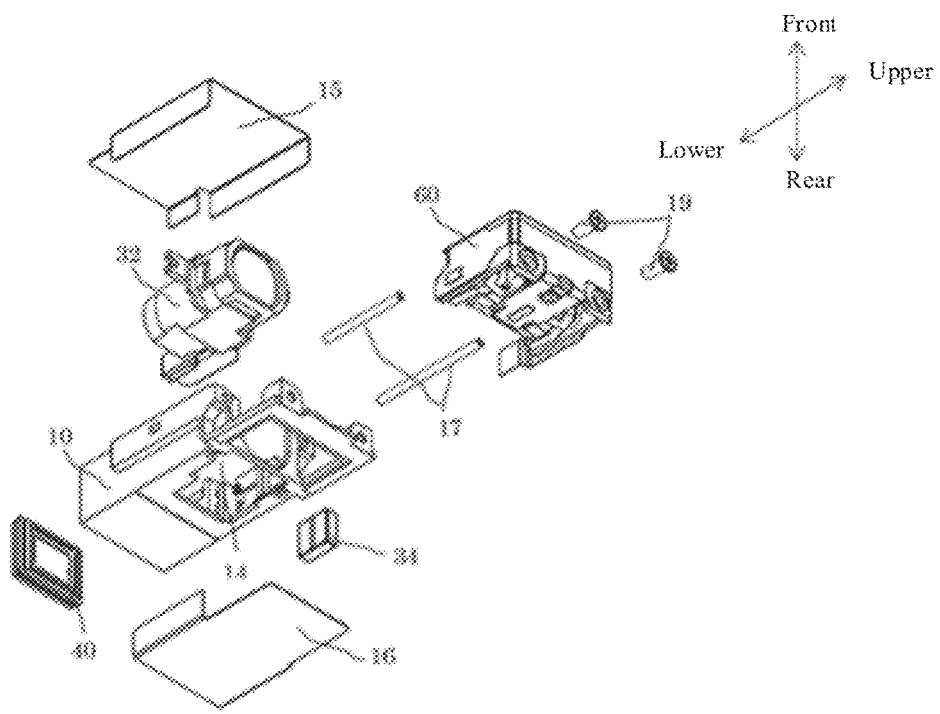
FIG. 5 is an exploded view of a curved camera device according to an embodiment of the present disclosure viewed from above.
Figure 6:
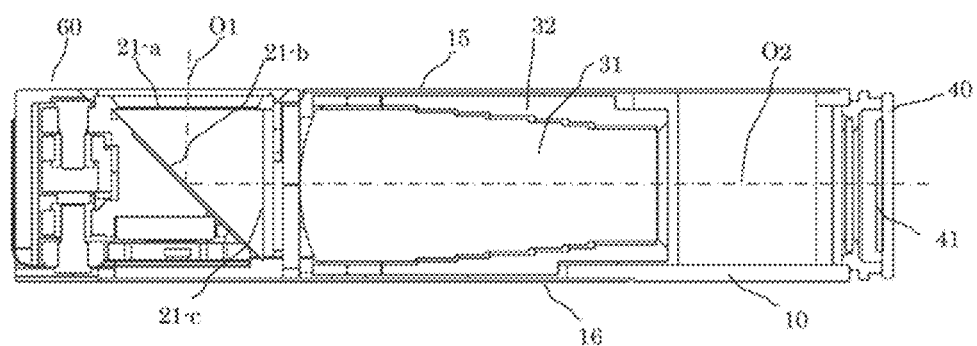
FIG. 6 is a cross-sectional view of a curved camera device according to an embodiment of the present disclosure taken along a plane formed by a first optical axis and a second optical axis.
Figure 7:
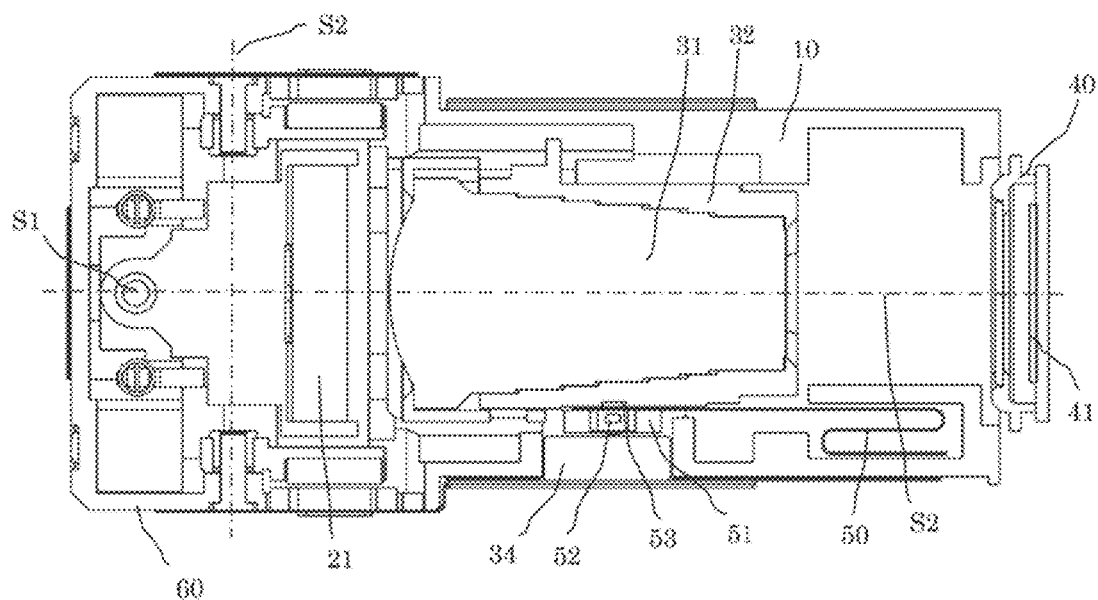
FIG. 7 is a cross-sectional view of a curved camera device according to an embodiment of the present disclosure taken along a plane passing through a rotation axis (B) S2 and parallel with a second optical axis.
Figure 8:
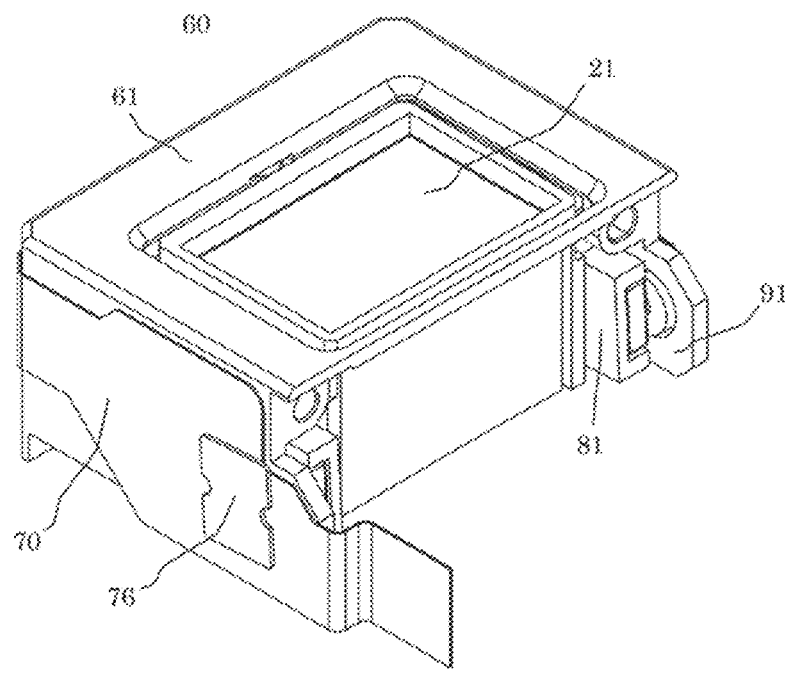
FIG. 8 is a perspective view of an anti-shake unit of a curved camera device according to an embodiment of the present disclosure viewed from below.
Figure 9:
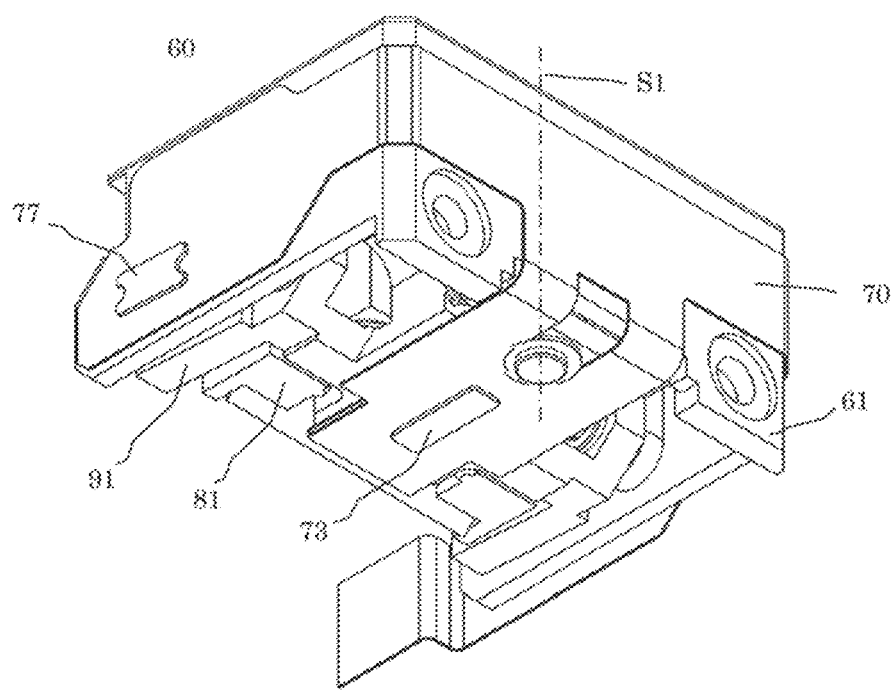
FIG. 9 is a perspective view of an anti-shake unit of a curved camera device according to an embodiment of the present disclosure viewed from above.
Figure 10:
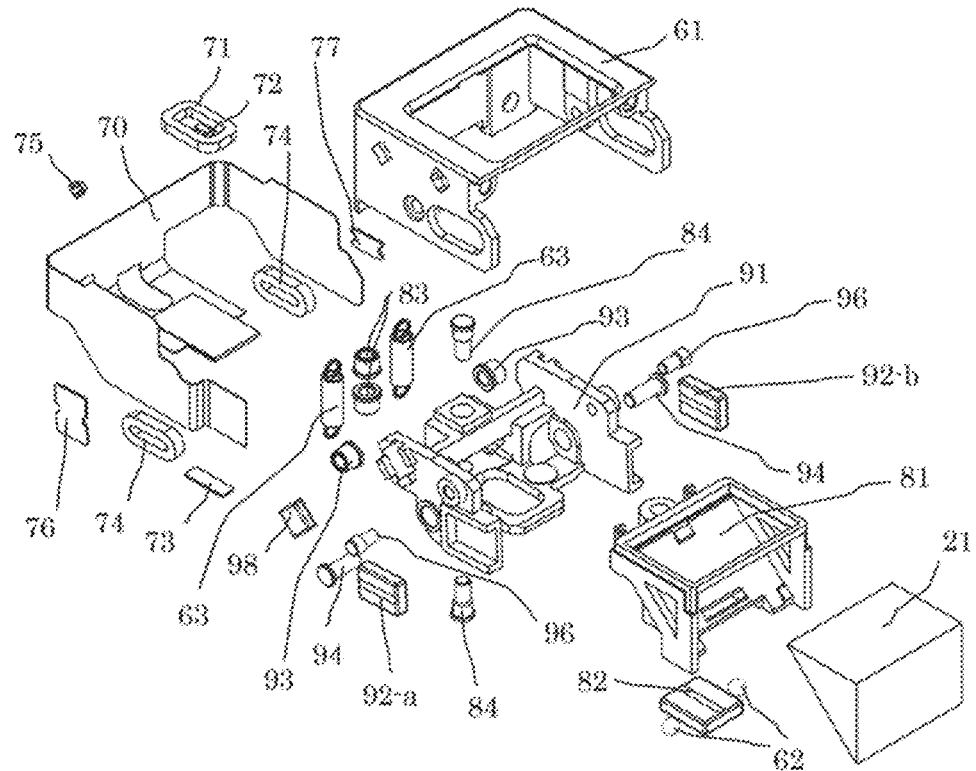
FIG. 10 is an exploded view of an anti-shake unit of a curved camera device according to an embodiment of the present disclosure viewed from below.
Figure 11:
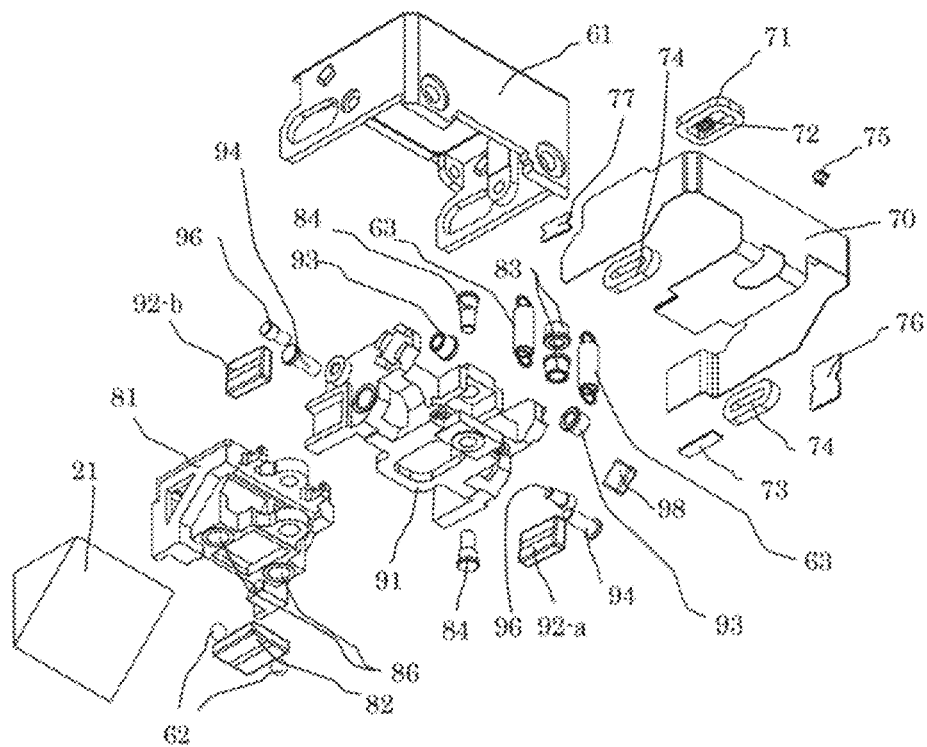
FIG. 11 is an exploded view of an anti-shake unit of a curved camera device according to an embodiment of the present disclosure viewed from above.
Figure 12:
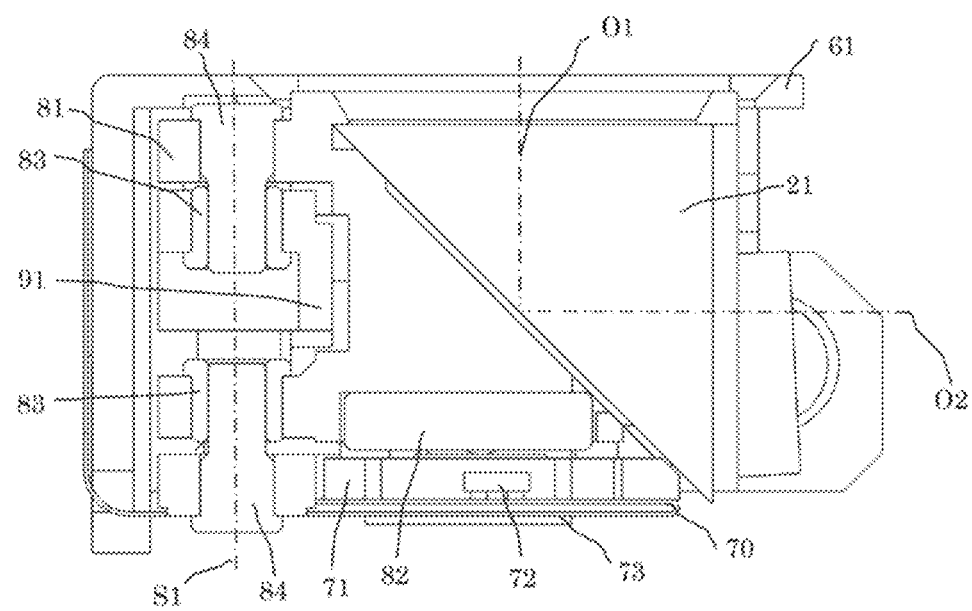
FIG. 12 is a cross-sectional view of an anti-shake unit of a curved camera device according to an embodiment of the present disclosure taken along a plane formed by a first optical axis and a second optical axis.
Figure 13:
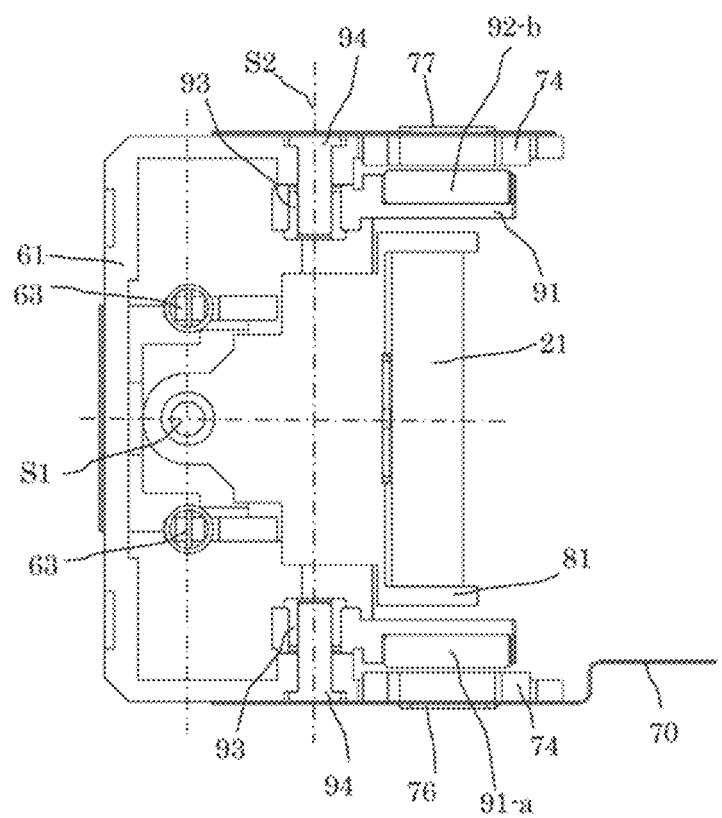
FIG. 13 is a cross-sectional view of an anti-shake unit of a curved camera device according to an embodiment of the present disclosure taken along a plane passing through a rotation axis (B) S2 and parallel with a second optical axis.
Figure 14:
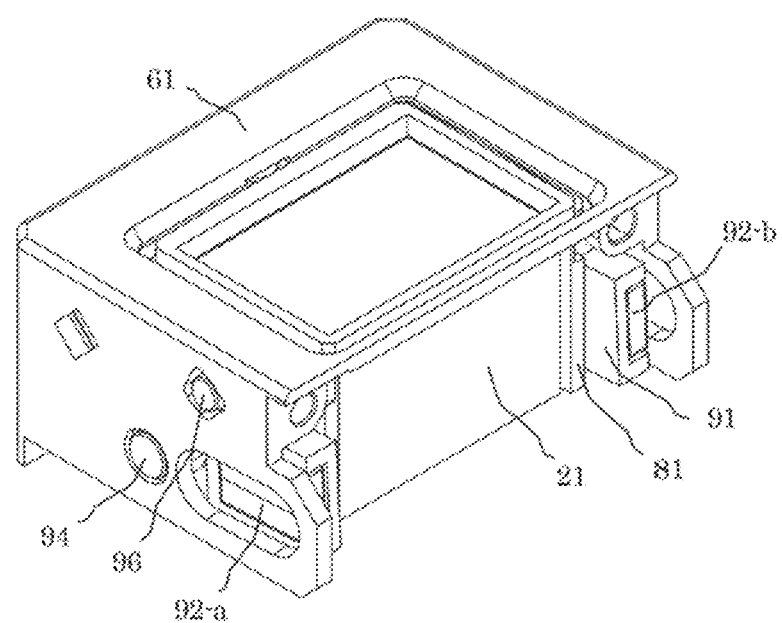
FIG. 14 is a perspective view of an anti-shake unit of a curved camera device according to an embodiment of the present disclosure viewed from below, with an anti-shake flexible substrate removed.
Figure 15:
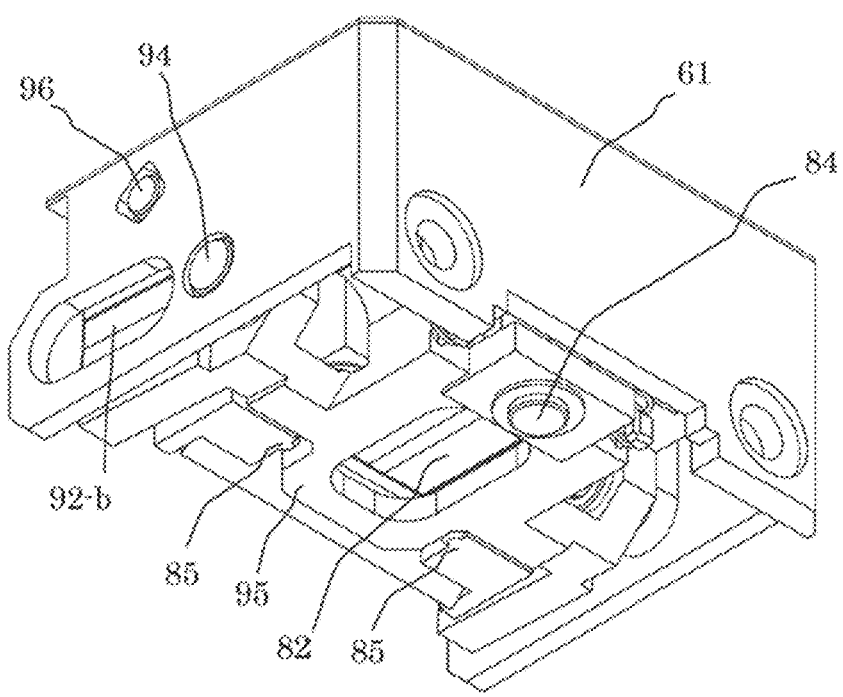
FIG. 15 is a perspective view of an anti-shake unit of a curved camera device according to an embodiment of the present disclosure viewed from above, with an anti-shake flexible substrate removed.
Figure 16:
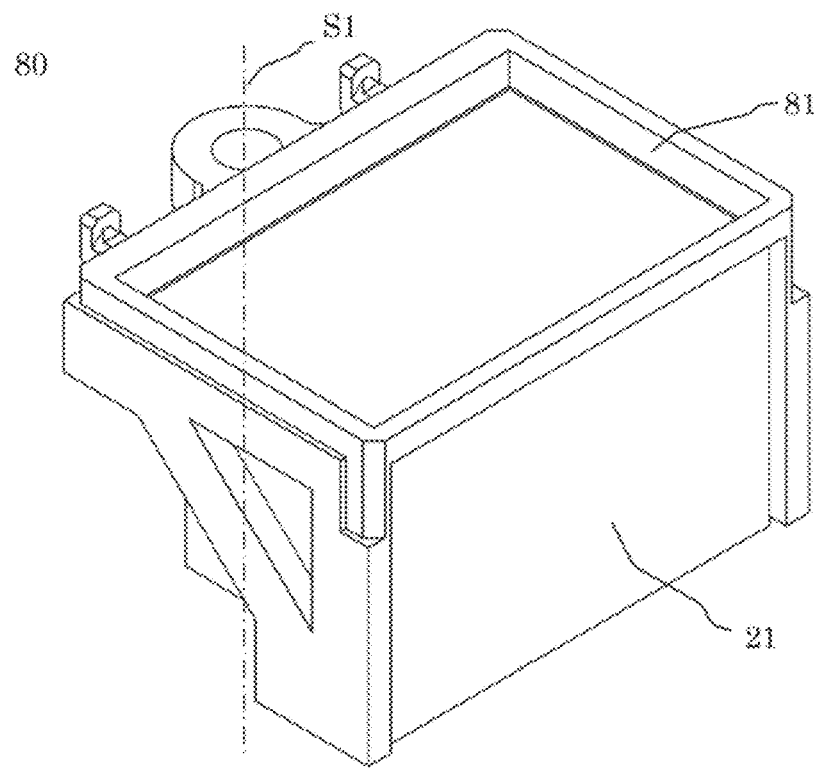
FIG. 16 is a perspective view of a first bracket block of a curved camera device according to an embodiment of the present disclosure viewed from below.
Figure 17:
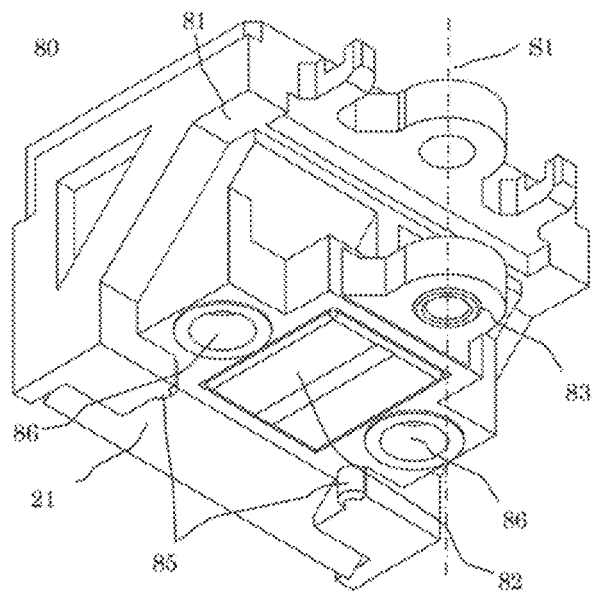
FIG. 17 is a perspective view of a first bracket block of a curved camera device according to an embodiment of the present disclosure viewed from above.
Figure 18:
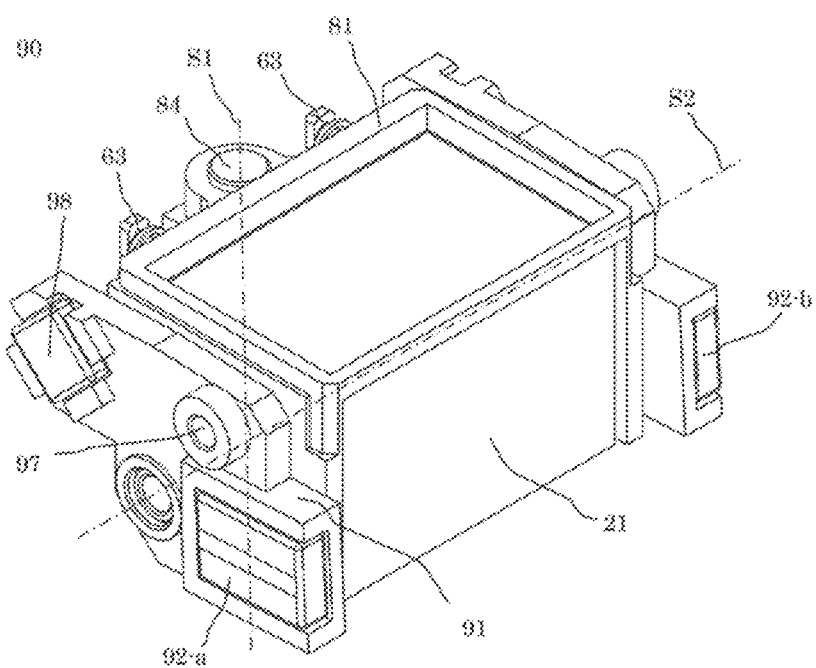
FIG. 18 is a perspective view of a second bracket block of a curved camera device according to an embodiment of the present disclosure viewed from below.
Figure 19:
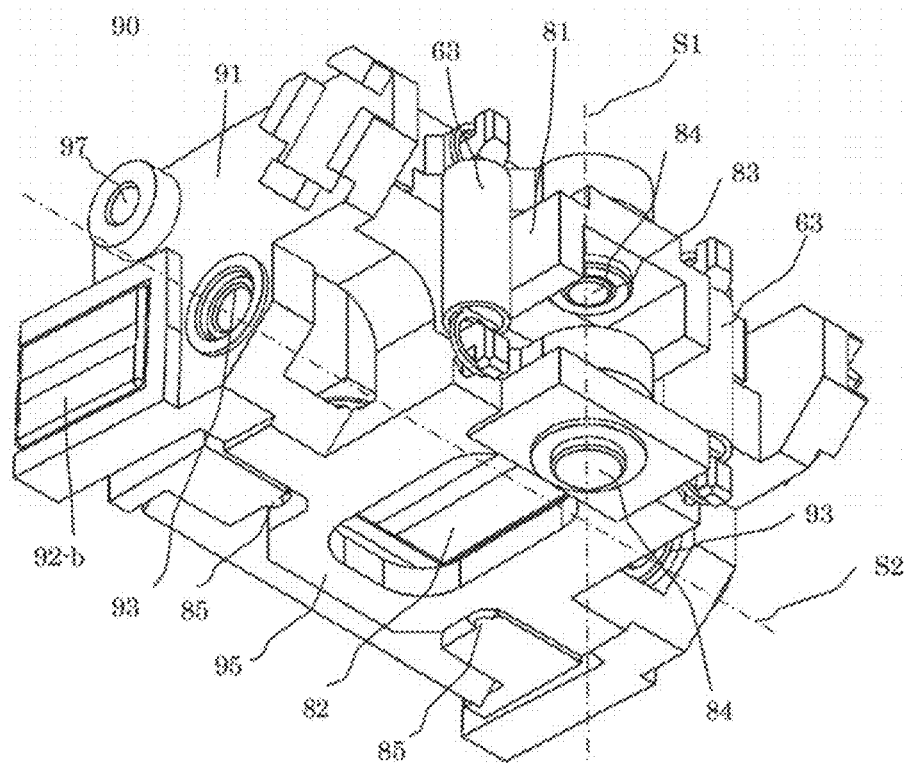
FIG. 19 is a perspective view of a second bracket block of a curved camera device according to an embodiment of the present disclosure viewed from above.
Figure 20:
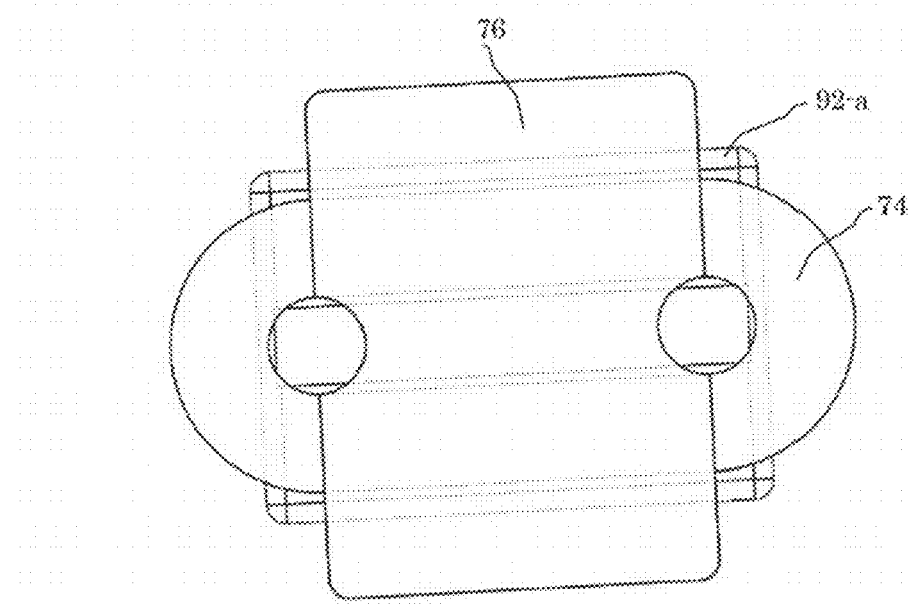
FIG. 20 is a structural view of a magnetic spring side constituting an axial sway elimination in a voice coil motor portion for a second bracket block of a curved camera device according to an embodiment of the present disclosure.
Figure 21:
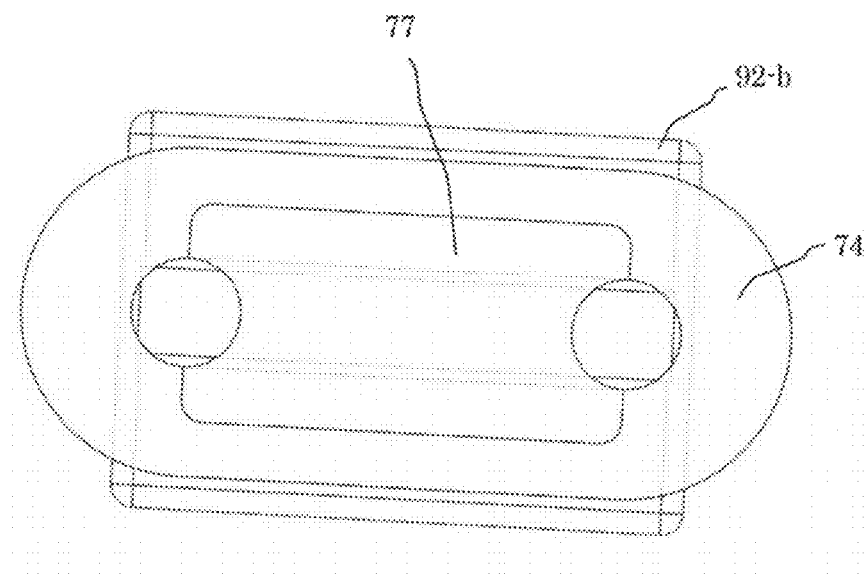
FIG. 21 is a structural view of a magnetic spring side constituting a center-hold in a voice coil motor portion for a second bracket block of a curved camera device according to an embodiment of the present disclosure.

The curved camera device 100 includes a housing 10. As shown in FIGS. 4 and 5, the housing 10 has: an upper fixing portion 11 holding the anti-shake unit 60 which includes the prism 21 and an anti-shake base serving as a base member; a box-shaped front side opening portion 12 and a rear side opening portion 13 that are open in a front-rear direction; and a lower opening portion 14 through which the light beam passes through towards the camera element. At the upper fixing portion 11, the anti-shake unit 60 including the prism 21 is fixed by two screws 19. At the front side opening portion 12, a camera lens frame 32 that holds the camera lens group 31 is supported by two shafts 17 and held in such a manner that it can move forward and backward along the second optical axis O2. At the lower opening portion 14, the camera element unit 40 is fixed in a direction perpendicular to the second optical axis O2 of the light beam that is emitted from the camera lens group 31.

Figure 1:
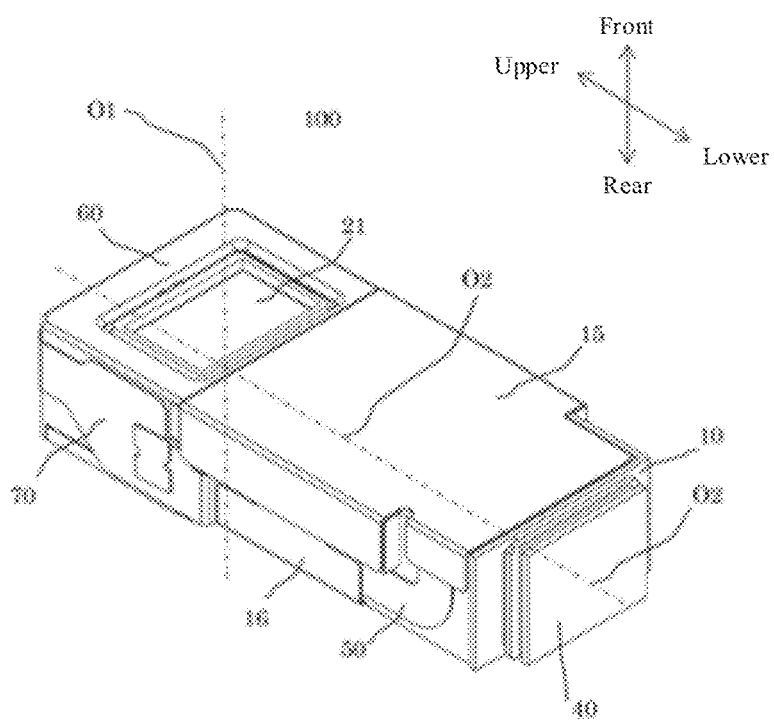
FIG. 1 is a perspective view of a curved camera device according to an embodiment of the present disclosure viewed from below.
Figure 2:
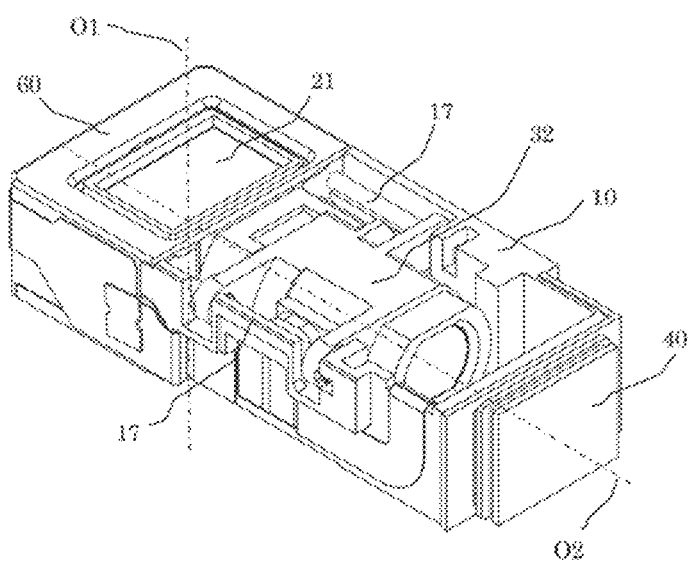
FIG. 2 is a perspective view of a curved camera device according to an embodiment of the present disclosure viewed from below, with a front side cover plate and a rear side cover plate removed.
Figure 3:
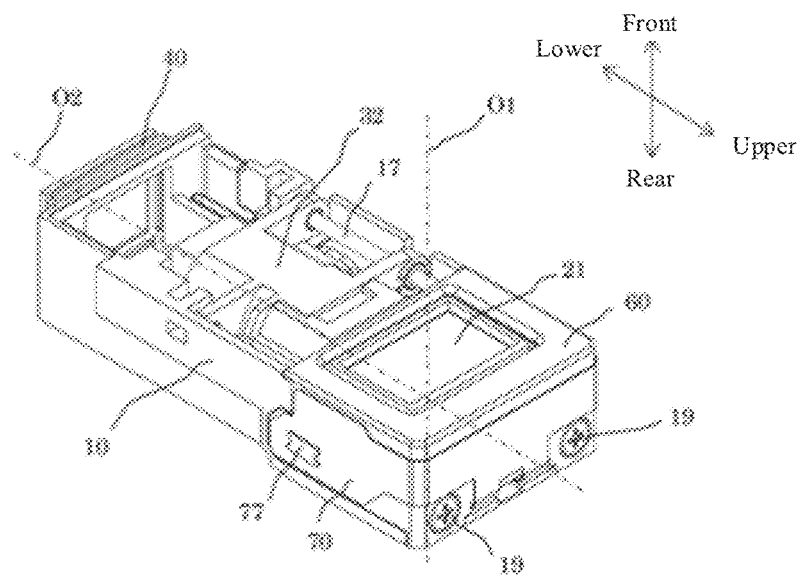
FIG. 3 is a perspective view of a curved camera device according to an embodiment of the present disclosure viewed from above, with a front side cover plate and a rear side cover plate removed.

The front side opening portion 12 and the rear side opening portion 13 of the housing 10 are covered by the front side cover plate 15 and the rear side cover plate 16 (FIGS. 1, 4, and 5).

A camera lens frame 32 that holds the camera lens group 31 is supported, in the box-shaped front side opening portion 12, by two shafts 17 so as to be linearly movable along the second optical axis O2. The camera lens frame 32 moves forward and backward along the second optical axis O2 by a driving force of an electromagnetic actuator (a voice coil motor) composed of a focusing flexible substrate 50 and a focusing permanent magnet 34, so as to perform a focusing action. The focusing flexible substrate 50 is provided with a focusing coil 51 and a focusing Hall sensor 52 which are fixed to a side surface portion 33 of the camera lens frame 32. The focusing permanent magnet 34 is fixed to a hole portion 18 of the housing 10 facing the focusing flexible substrate 50.

The focusing yoke 53 is provided on a surface side of the focusing coil 51 that is not facing the focusing permanent magnet 34, and it is fixed to the camera lens frame 32 in the same manner as the focusing coil 51.

The focusing yoke 53 has a function of causing the camera lens group 31 to return to a magnetic spring at a given position when the camera lens group 31 moves due to a change in a focus position, and also has a function of applying a force in one direction with respect to radial sway between the camera lens group 31 and the shaft 17 supporting the camera lens frame 32, and a function of causing leakage magnetic flux of the focusing coil 51 to converge so as to increase an electromagnetic efficiency of the focusing permanent magnet 34 and the focusing coil 51.

By providing the focusing Hall sensor 52, a position of the focusing permanent magnet 34 can be detected, thereby achieving an adjustment of the focus position with higher precision and an accurate control in the case where an adjustment speed of the focus is relatively important.

The focusing coil 51 may be a coil winding that is mounted and fixed to the camera lens frame 32, or a conductive pattern formed directly on the focusing flexible substrate 50.

The curved camera device 100 includes an anti-shake (image shake correction) unit 60, and the anti-shake (image shake correction) unit 60 mitigates the image shake on an image plane caused by a vibration such as hand-shake. The anti-shake unit 60 is configured in such a manner that it enables the prism 21 to rotate with a rotation axis (A) S1 perpendicular to a plane formed by the optical axis O2 of the camera lens group and the optical axis O1 located on the object side and reflected by the reflecting member, and an axis (B) S2 parallel with the reflected object-side optical axis as rotation axes.

The prism 21 is fixed to a first bracket 81 by bonding or the like. In addition, a permanent magnet A82 constituting a voice coil motor is further fixed to the first bracket. A bushing 83 made of metal is press-fitted into a hole portion of the rotation axis (A) S1 axis that is shaft-supported at a second bracket 91. This block is referred to as a first bracket block 80.

The first bracket block 80 is shaft-supported by inserting a shaft 84 into the rotation axis (A) S1 axis of the second bracket 91. The shaft 84 is fixed to a hole portion of the S1 axis of the second bracket 91 and is dimensioned to be able to smoothly rotate with respect to the bushing 83. In addition, as for two protrusion portions 85 of the first bracket 81 and a protrusion portion 95 of the second bracket 91, a certain gap is arranged in the rotation direction, such that a movable range of the first bracket block 80 with respect to the second bracket 91 in the rotation direction is restricted.

The second bracket 91 is further provided with an anti-shake flexible substrate 70. The anti-shake flexible substrate 70 is provided with an anti-shake coil A71 and an anti-shake Hall sensor A72 for position detection, and constitutes a voice coil motor together with the permanent magnet A82 of the first bracket block 80 by fixing the anti-shake coil A71 and the anti-shake Hall sensor A72 at a position shown in the drawing. Further, a yoke, i.e., an anti-shake yoke A73, which is made of a magnetic metal and mutually attracted with the permanent magnet A82 of the electromagnetic actuator, is adhered to a back surface of the anti-shake coil A71 of the anti-shake flexible substrate 70. The anti-shake yoke A73 plays a role by functioning as a magnetic spring that is held at a given position (a center of the movement range in the embodiment) by magnetism with the permanent magnet A82 of the first bracket block 80.

The first bracket 81 includes a cylindrical recessed portion 86 capable of holding a ball 62, for use in sliding between the ball 62 and the second bracket block 90. In addition, a sliding surface is also formed in opposite portions of the second bracket 91, and, similar to the sliding surface of the cylindrical recessed portion 86 of the first bracket 81, surface precision is set so that the rotation can be smooth.

The first bracket block 80 and the second bracket block 90 are applied with a force by a tension spring 63 in such a direction that they are caused to abut against the ball 62, and a position in the direction parallel with the rotation axis can be determined according to a height of the ball 62. Further, an object is to eliminate the sway caused by manufacturing errors of the various members.

Further, a force-applying direction of the spring 63 is consistent with an attraction direction between the permanent magnet A82 and the anti-shake yoke A73 that are constituting the magnetic spring that holds the first bracket block 80, thereby achieving a more stable magnetic spring effect.

In the case where the prism 21 has a sway component in a direction parallel with the first optical axis O1, it is conceivable that the second optical axis O2 might move in parallel to generate an image shake that is beyond the hand-shake correction control. Therefore, in the present embodiment, it is necessary to eliminate the sway component of the first bracket block 80 in the direction parallel with the rotation axis.

In the present disclosure, by applying a spring force to the first bracket block 80 in a direction parallel with the rotation axis with respect to the second bracket block 90 and using the ball in a sliding portion, the sway can be reliably eliminated with a low load.

The second bracket 91 is also fixedly provided with two permanent magnets B92-*a* and 92-*b* which constitute a voice coil motor, and a permanent magnet 98 for position detection. A bushing 93 made of metal is press-fitted to a hole portion of the rotation axis (B) S2 axis of an anti-shake base 61. This block is referred to as a second bracket block 90.

The second bracket block 90 is inserted into the anti-shake base 61 and is shaft-supported by inserting a shaft 94 into the hole portion of the rotation axis (B) S2 axis. The shaft 94 is fixed to the hole portion of the S2 axis of the anti-shake base, and is dimensioned to be able to smoothly rotate with respect to the bushing 93. Further, in this state, by inserting a pin 96 into the hole portion 97 of the second bracket 91, a movable range of the second bracket block 90 with respect to the anti-shake base 61 in a rotation direction is restricted.

This unitized block is referred to as an anti-shake unit 60.

Further, in this case, the rotation axis (B) S2 is preferably as close as possible to the reflecting surface 21-*b* of the prism.

The anti-shake base 61 is further provided with an anti-shake flexible substrate 70. The anti-shake flexible substrate 70 is provided with two anti-shake coils B74 and an anti-shake Hall sensor B75 for position detection, and constitutes a voice coil motor together with the two permanent magnets B92-*a*, 92-*b* of the second bracket block 90 and the two anti-shake coils B74 by fixing the two anti-shake coils B74 and the anti-shake Hall sensor B75 to a position shown in the drawing. The position-detecting permanent magnet 98 of the second bracket block 90 plays a role of position detecting together with the anti-shake Hall sensor B75.

Two anti-shake yokes (B1) 76 and an anti-shake yoke (B2) 77, which are made of magnetic metal and have different dimensions, are adhered to back surfaces of the two anti-shake coils B74 of the anti-shake flexible substrate 70, respectively.

The anti-shake yoke (B1) 76 on the side opposite to the permanent magnet B92-*a* of the second bracket block 90 is larger than the permanent magnet B92-*a*, so even if the second bracket 91 rotates, an attraction force will not change greatly. In other words, it is always attracted towards one side with respect to the rotation axis S2 of the second bracket block 90, thereby achieving axial sway elimination.

The direction of the sway elimination is consistent with a direction in which a distance between the position-detecting permanent magnet 98 and the anti-shake Hall sensor B75 is determined, so that a stable position detection can be performed. The anti-shake yoke (B2) 77 on the side opposite to the permanent magnet B92-*b* of the other second bracket block 90 is thinner than the permanent magnet B92-*b*, so that an attraction force is generated for center-holding the second bracket 91. That is, in the case where the second bracket block 90 rotates, it plays a role by functioning as a magnetic spring that is held at a given position (a center of a movement range in the embodiment) by magnetism.

In the present embodiment, the second prism can be a mirror (not shown in the drawing).

Figure 22:
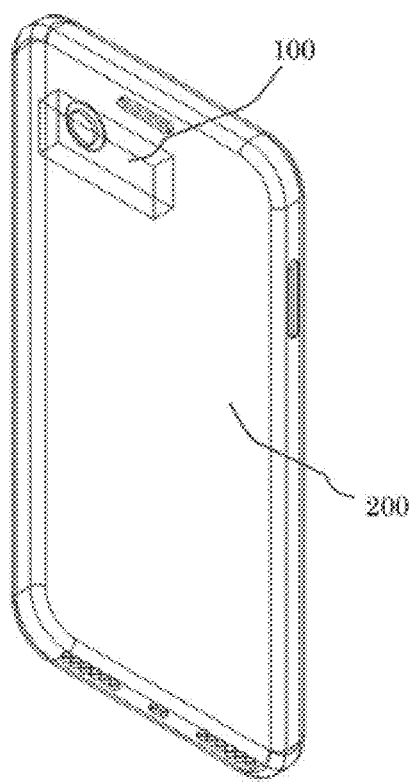
FIG. 22 shows a portable electronic device (portable information terminal) including a curved camera device of the present disclosure.

For example, the above curved camera device 100 can also be a camera device 100 for use in a portable information device 200 as shown in FIG. 22, such as a so-called smart phone, a so-called function phone or a tablet device.

What has been described above are only embodiments of the present disclosure, and the scope the present disclosure is not limited to the above embodiments. All equivalent modifications and variations made by those skilled in the art based on contents of the present disclosure are within the scope of the appended claims of the present disclosure.

SYMBOL DESCRIPTION

10 . . . housing
11 . . . upper fixing portion
12 . . . front side opening portion
13 . . . rear side opening portion
14 . . . lower opening portion
15 . . . front side cover plate
16 . . . rear side cover plate
17 . . . shaft
18 . . . hole portion
19 . . . screw
21 . . . prism
21-*a* . . . incident surface of prism
21-*b* . . . reflecting surface of prism
21-*c* . . . emission surface of prism
31 . . . camera lens group
32 . . . camera lens frame
33 . . . side surface portion
34 . . . focusing permanent magnet
40 . . . camera element unit
41 . . . camera element
50 . . . focusing flexible substrate
51 . . . focusing coil
52 . . . focusing Hall sensor
53 . . . focusing yoke
60 . . . anti-shake unit
61 . . . anti-shake base
62 . . . ball
63 . . . tension spring
70 . . . anti-shake flexible substrate
71 . . . anti-shake coil A
72 . . . anti-shake Hall Sensor A
73 . . . anti-shake yoke A
74 . . . anti-shake coil B
75 . . . anti-shake Hall Sensor B
76 . . . anti-shake yoke (B1)
77 . . . anti-shake yoke (B2)
80 . . . first bracket block
81 . . . first bracket
82 . . . permanent magnet A
83 . . . bushing 84 . . . shaft
85 . . . protrusion portion
86 . . . cylindrical recessed portion
90 . . . second bracket block
91 . . . second bracket
92-a . . . permanent magnet B
92-b . . . permanent magnet C
93 . . . bushing
94 . . . shaft
95 . . . protrusion portion
96 . . . pin
97 . . . hole portion
98 . . . position-detecting permanent magnet
100 . . . curved camera device
200 . . . portable information device
O1 . . . first optical axis
O2 . . . second optical axis
S1 . . . rotation axis (A)
S2 . . . rotation axis (B).

What is claimed is:

1. An anti-shake mechanism of a curved camera device, the camera device being an optical system comprising a reflecting member having a reflecting surface that bends an optical axis and being configured to perform a hand-shake correction by rotating the reflecting member, wherein,
the reflecting member is arranged to be closer to an object side than a camera lens group,
when a first rotation axis is set as an axis perpendicular to a plane defined by an optical axis of the camera lens group and an object-side optical axis reflected by the reflecting member and a second rotation axis is set as an axis parallel with the reflected object-side optical axis, the reflecting member is caused to rotate about the first rotation axis and the second rotation axis,
two ends of a shaft are respectively provided with a plurality of voice coil motors that cause the reflecting member to rotate about the first rotation axis;
wherein the reflecting member is held at a first holding frame, the first holding frame is held at a second holding frame in such a manner that the first holding frame is rotatable about one of the first rotation axis and the second rotation axis, the second holding frame is held at a base member in such a manner that the second holding frame is rotatable about the other one of the first rotation axis and the second rotation axis, a first electromagnetic actuator that rotates the first holding frame is formed between the first holding frame and the second holding frame, and a second electromagnetic actuator that rotates the second holding frame is provided between the second holding frame and the base member;
the first holding frame or the second holding frame, which causes the reflecting member to rotate about the second rotation axis, comprises a force-applying unit for eliminating axial sway;
a force-applying direction of the force-applying unit is the same as a direction in which a permanent magnet and a yoke of the first or second electromagnetic actuator attract each other.

2. The anti-shake mechanism of the curved camera device as described in claim 1, wherein a ball is used on a sliding surface to reduce friction.

3. The anti-shake mechanism of the curved camera device as described in claim 1, wherein both of the electromagnetic actuators are voice coil motors.

4. The anti-shake mechanism of the curved camera device as described in claim 1, wherein,
the first holding frame or the second holding frame, which causes the reflecting member to rotate about the first rotation axis, comprises a first yoke member for center-holding at one of two ends of the shaft, and a second yoke member for eliminating the axial sway at the other one of the two ends of the shaft.

5. The anti-shake mechanism of the curved camera device as described in claim 1, wherein the reflecting member is a prism.

6. The anti-shake mechanism of the curved camera device as described in claim 1, wherein the reflecting member is a mirror.

7. A camera, comprising an anti-shake mechanism of a curved camera device, the camera device being an optical system comprising a reflecting member having a reflecting surface that bends an optical axis and being configured to perform a hand-shake correction by rotating the reflecting member, wherein,
the reflecting member is arranged to be closer to an object side than a camera lens group,
when a first rotation axis is set as an axis perpendicular to a plane defined by an optical axis of the camera lens group and an object-side optical axis reflected by the reflecting member and a second rotation axis is set as an axis parallel with the reflected object-side optical axis, the reflecting member is caused to rotate about the first rotation axis and the second rotation axis,
two ends of a shaft are respectively provided with a plurality of voice coil motors that cause the reflecting member to rotate about the first rotation axis;
wherein the reflecting member is held at a first holding frame, the first holding frame is held at a second holding frame in such a manner that the first holding frame is rotatable about one of the first rotation axis and the second rotation axis, the second holding frame is held at a base member in such a manner that the second holding frame is rotatable about the other one of the first rotation axis and the second rotation axis, a first electromagnetic actuator that rotates the first holding frame is formed between the first holding frame and the second holding frame, and a second electromagnetic actuator that rotates the second holding frame is provided between the second holding frame and the base member;
the first holding frame or the second holding frame, which causes the reflecting member to rotate about the second rotation axis, comprises a force-applying unit for eliminating axial sway;
a force-applying direction of the force-applying unit is the same as a direction in which a permanent magnet and a yoke of the first or second electromagnetic actuator attract each other.

8. A portable electronic device, comprising a camera, the camera comprising an anti-shake mechanism of a curved camera device, the camera device being an optical system comprising a reflecting member having a reflecting surface that bends an optical axis and being configured to perform a hand-shake correction by rotating the reflecting member, wherein,
the reflecting member is arranged to be closer to an object side than a camera lens group,
when a first rotation axis is set as an axis perpendicular to a plane defined by an optical axis of the camera lens group and an object-side optical axis reflected by the reflecting member and a second rotation axis is set as an axis parallel with the reflected object-side optical axis, the reflecting member is caused to rotate about the first rotation axis and the second rotation axis, two ends of a shaft are respectively provided with a plurality of voice coil motors that cause the reflecting member to rotate about the first rotation axis;

wherein the reflecting member is held at a first holding frame, the first holding frame is held at a second holding frame in such a manner that the first holding frame is rotatable about one of the first rotation axis and the second rotation axis, the second holding frame is held at a base member in such a manner that the second holding frame is rotatable about the other one of the first rotation axis and the second rotation axis, a first electromagnetic actuator that rotates the first holding frame is formed between the first holding frame and the second holding frame, and a second electromagnetic actuator that rotates the second holding frame is provided between the second holding frame and the base member;

the first holding frame or the second holding frame, which causes the reflecting member to rotate about the second rotation axis, comprises a force-applying unit for eliminating axial sway;

a force-applying direction of the force-applying unit is the same as a direction in which a permanent magnet and a yoke of the first or second electromagnetic actuator attract each other.

\* \* \* \* \*